United States Patent
Zehngut et al.

(10) Patent No.: US 12,112,112 B2
(45) Date of Patent: Oct. 8, 2024

(54) METHOD FOR CO-DESIGN OF HARDWARE AND NEURAL NETWORK ARCHITECTURES USING COARSE-TO-FINE SEARCH, TWO-PHASED BLOCK DISTILLATION AND NEURAL HARDWARE PREDICTOR

(71) Applicant: SAMSUNG ELECTRONICS CO., LTD., Suwon-si (KR)

(72) Inventors: Niv Zehngut, Tel-Mond (IL); Amir Ben-Dror, Ness Ziona (IL); Evgeny Artyomov, Rehovot (IL); Michael Dinerstein, Rehovot (IL); Roy Jevnisek, Givatayim (IL)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1001 days.

(21) Appl. No.: 17/095,937

(22) Filed: Nov. 12, 2020

(65) Prior Publication Data

US 2022/0147680 A1 May 12, 2022

(51) Int. Cl.
*G06F 30/39* (2020.01)
*G06F 117/04* (2020.01)
(Continued)

(52) U.S. Cl.
CPC ............... *G06F 30/39* (2020.01); *G06N 3/04* (2013.01); *G06N 3/082* (2013.01); *G06N 3/086* (2013.01);
(Continued)

(58) Field of Classification Search
CPC ........ G06N 3/092; G06N 3/0985; G06N 3/08; G06N 3/082; G06N 3/084; G06N 3/086;
(Continued)

(56) References Cited

U.S. PATENT DOCUMENTS

| 10,685,286 B1 * | 6/2020 | McDonnell | ............ G06N 3/045 |
| 11,334,791 B2 * | 5/2022 | Singh | ..................... G06N 3/006 |

(Continued)

FOREIGN PATENT DOCUMENTS

| WO | 2018171717 | 9/2018 | | |
| WO | WO-2019085655 A1 * | 5/2019 | ......... | G06F 16/9535 |

(Continued)

OTHER PUBLICATIONS

Chang, J., Zhang, X., Guo, Y., Meng, G., Xiang, S., & Pan, C. (2019). Differentiable architecture search with ensemble gumbel-softmax. arXiv preprint arXiv:1905.01786. (Year: 2019).*

(Continued)

*Primary Examiner* — Andrew L Tank
(74) *Attorney, Agent, or Firm* — F. CHAU & ASSOCIATES, LLC

(57) ABSTRACT

Methods, systems, and apparatus for combined or separate implementation of coarse-to-fine neural architecture search (NAS), two-phase block NAS, variable hardware prediction, and differential hardware design are provided and described. A variable predictor is trained, as described herein. Then, a controller or policy may be used to iteratively modify a neural network architecture along dimensions formed by neural network architecture parameters. The modification is applied to blocks (e.g., subnetworks) within the neural network architecture. In each iteration, the remainder of the neural network architecture parameters are modified and learned with a differential NAS method. The training process is performed with two-phase block NAS and incorporates a variable hardware predictor to predict power, performance, and area (PPA) parameters. The hardware parameters may be learned as well using the variable hardware predictor.

20 Claims, 14 Drawing Sheets

(51) Int. Cl.
| | |
|---|---|
| G06F 117/08 | (2020.01) |
| G06F 119/06 | (2020.01) |
| G06N 3/04 | (2023.01) |
| G06N 3/082 | (2023.01) |
| G06N 3/086 | (2023.01) |

(52) U.S. Cl.
CPC ...... *G06F 2117/04* (2020.01); *G06F 2117/08* (2020.01); *G06F 2119/06* (2020.01)

(58) Field of Classification Search
CPC .......... G06N 3/045; G06N 3/04; G06F 30/39; G06F 30/27; G06F 2117/08; G06F 2119/06; G06F 2117/04
See application file for complete search history.

(56) References Cited

U.S. PATENT DOCUMENTS

| | | | | |
|---|---|---|---|---|
| 11,347,995 | B2* | 5/2022 | Bender | G06N 3/04 |
| 11,429,865 | B1* | 8/2022 | Patton | G06N 3/082 |
| 11,443,162 | B2* | 9/2022 | Yang | G06N 3/04 |
| 11,494,626 | B2* | 11/2022 | Hostetler | G06F 1/3287 |
| 11,544,561 | B2* | 1/2023 | Mittal | G06F 18/213 |
| 11,610,115 | B2* | 3/2023 | Kar | G06T 11/00 |
| 11,715,042 | B1* | 8/2023 | Liu | G06N 3/006 |
| | | | | 705/26.1 |
| 11,748,615 | B1* | 9/2023 | Wu | G06N 3/08 |
| | | | | 706/25 |
| 2017/0061326 | A1* | 3/2017 | Talathi | G06F 18/2413 |
| 2017/0262737 | A1* | 9/2017 | Rabinovich | G06N 3/082 |
| 2019/0180186 | A1* | 6/2019 | Liang | G06N 3/048 |
| 2019/0232489 | A1* | 8/2019 | Pascanu | G05B 13/027 |
| 2019/0354837 | A1* | 11/2019 | Zhou | G06N 3/044 |
| 2019/0362235 | A1* | 11/2019 | Xu | G06T 7/70 |
| 2020/0104687 | A1* | 4/2020 | Gesmundo | G06N 3/08 |
| 2020/0143227 | A1* | 5/2020 | Tan | G06N 3/044 |
| 2020/0210832 | A1* | 7/2020 | Driscoll | G06N 3/063 |
| 2021/0073612 | A1* | 3/2021 | Vahdat | G06N 3/048 |
| 2021/0073995 | A1* | 3/2021 | Yang | G06N 3/08 |
| 2021/0352487 | A1* | 11/2021 | Routt | H04W 72/542 |
| 2021/0374502 | A1* | 12/2021 | Roth | G06N 3/08 |
| 2021/0374518 | A1* | 12/2021 | Zhu | G06F 9/3877 |
| 2021/0406695 | A1* | 12/2021 | Pandarinath | G06V 10/82 |
| 2022/0019869 | A1* | 1/2022 | Li | G06N 3/04 |
| 2022/0019880 | A1* | 1/2022 | Dasgupta | G06N 3/04 |
| 2022/0130038 | A1* | 4/2022 | Wang | G16H 30/20 |

FOREIGN PATENT DOCUMENTS

| | | |
|---|---|---|
| WO | 2019108923 | 6/2019 |
| WO | 2020093071 | 5/2020 |

OTHER PUBLICATIONS

Liu, H., Simonyan, K., & Yang, Y. (2018). Darts: Differentiable architecture search. arXiv preprint arXiv:1806.09055. (Year: 2018).*
Li Dong and Mirella Lapata. 2018. Coarse-to-Fine Decoding for Neural Semantic Parsing. In Proceedings of the 56th Annual Meeting of the Association for Computational Linguistics (vol. 1: Long Papers), pp. 731-742, Melbourne, Australia. Association for Computational Linguistics. (Year: 2018).*
Green, S., Vineyard, C. M., Helinski, R., & Koç, C. K. (Jul. 2020). RAPDARTS: resource-aware progressive differentiable architecture search. In 2020 International Joint Conference on Neural Networks (IJCNN) (pp. 1-7). IEEE. (Year: 2020).*
Zoph, B., Vasudevan, V., Shlens, J., & Le, Q. V. (2018). Learning transferable architectures for scalable image recognition. In Proceedings of the IEEE conference on computer vision and pattern recognition (pp. 8697-8710). (Year: 2018).*
Wikipedia, "Neural architecture search", The Wayback Machine https://web.archive.org/web/20201105001137/https://en.wikipedia.org/wiki/Neural_architecture_search, Nov. 5, 2020 (Year: 2020).*
Zoph, B., & Le, Q. V. (2016). Neural architecture search with reinforcement learning. arXiv preprint arXiv:1611.01578. (Year: 2016).*
Vahdat, A., Mallya, A., Liu, M. Y., & Kautz, J. (2020). Unas: Differentiable architecture search meets reinforcement learning. In Proceedings of the IEEE/CVF conference on computer vision and pattern recognition (pp. 11266-11275). (Year: 2020).*
Pham, H., Guan, M., Zoph, B., Le, Q., & Dean, J. (2018, July). Efficient neural architecture search via parameters sharing. In International conference on machine learning (pp. 4095-4104). PMLR. (Year: 2018).*
Schmidt, M., Safarani, S., Gastinger, J., Jacobs, T., Nicolas, S., & Schulke, A. (Jul. 2019). On the performance of differential evolution for hyperparameter tuning. In 2019 international joint conference on neural networks (IJCNN) (pp. 1-8). IEEE. (Year: 2019 ).*
Real, E., Aggarwal, A., Huang, Y., & Le, Q. V. (Jul. 2019). Regularized evolution for image classifier architecture search. In Proceedings of the AAAI conference on artificial intelligence (vol. 33, No. 01, pp. 4780-4789). (Year: 2019).*
Miconi, T. (2016). Neural networks with differentiable structure. arXiv preprint arXiv:1606.06216. (Year: 2016).*
Jin, X., Wang, J., Slocum, J., Yang, M. H., Dai, S., Yan, S., & Feng, J. (2019). Rc-darts: Resource constrained differentiable architecture search. arXiv preprint arXiv:1912.12814. (Year: 2019).*
Liu, C., Zoph, B., Neumann, M., Shlens, J., Hua, W., Li, L. J., . . . & Murphy, K. (2018). Progressive neural architecture search. In Proceedings of the European conference on computer vision (ECCV) (pp. 19-34). (Year: 2018).*
Li, et al., "Weight-dependent Gates for Network Pruning", arXiv:2007.02066v2 [cs.CV] Aug. 17, 2020, 19 pages.
Xu, et al., "Latency-Aware Differentiable Neural Architecture Search", arXiv:2001.06392v2 [cs.CV] Mar. 26, 2020, 19 pages.
Chen, et al., "You Only Search Once: A Fast Automation Framework for Single-Stage DNN/Accelerator Co-design", (2020) (U Beijing), 6 pages.
Abdelfattah, et al., "Best of Both Worlds: AutoML Codesign of a CNN and its Hardware Accelerator", arXiv:2002.05022v2 [eess.SP] Mar. 6, 2020, 7 pages.
Jiang, et al., "Accuracy vs. Eiciency: Achieving Both through FPGA-Implementation Aware Neural Architecture Search", 2019, 6 pages.
Jiang, et al., "Hardware/Software Co-Exploration of Neural Architectures", IEEE Transactions On Computer-Aided Design of Integrated Circuits and Systems, Jan. 11, 2020, 10 pages.
Yang, et al., "Co-Exploration of Neural Architectures and Heterogeneous ASIC Accelerator Designs Targeting Multiple Tasks" Feb. 10, 2020, 7 pages.
Jiang, et al., "Standing on the Shoulders of Giants: Hardware and Neural Architecture Co-Search with Hot Start", IEEE Transactions On Computer-Aided Design of Integrated Circuits and Systems, Jul. 17, 2020, 13 pages.
Yu, et al., "C2FNAS: Coarse-to-Fine Neural Architecture Search for 3D Medical Image Segmentation", arXiv:1912.09628v2 [cs.CV] Apr. 20, 2020, 10 pages.
Kyriakides, et al., "Regularized Evolution for Macro Neural Architecture Search", (2020) (U Macedonia), 12 pages.
Wang, et al., "Progressive Blockwise Knowledge Distillation for Neural Network Acceleration", Proceedings of the Twenty-Seventh International Joint Conference on Artificial Intelligence (IJCAI-18), 7 pages.
Colangelo, et al., "Artificial Neural Network and Accelerator Co-design using Evolutionary Algorithms", 2019 IEEE, 8 pages.
Kobayashi, et al., "An Evolution-based Approach for Efcient Differentiable Architecture Search", 2020, pp. 131-132.
Li, et al., "Blockwisely Supervised Neural Architecture Search with Knowledge Distillation", arXiv:1911.13053v2 [cs.CV] Mar. 6, 2020, 11 pages.
Choi, et al., "DANCE Differentiable Accelerator/Network Co-Exploration", arXiv2009.06237v1 [cs.LG] Sep. 14, 2020. 9 pages.

* cited by examiner

METHOD FOR CO-DESIGN OF HARDWARE AND NEURAL NETWORK ARCHITECTURES USING COARSE-TO-FINE SEARCH, TWO-PHASED BLOCK DISTILLATION AND NEURAL HARDWARE PREDICTOR

BACKGROUND

The following relates generally to neural networks, and more specifically to neural architecture search (NAS).

Efficient and high-performing neural network processing is becoming important on devices such as computers, smartphones, tablets, and wearables. A neural network is a form of data processing where input data or input signals are processed with a set of operations and grouped into layers or blocks. Each layer is parameterized by a set of operations, an order of the operations, and coefficients of the operations (e.g., which may be referred to as weights). Accordingly, a neural network generally includes an architecture and weights. The architecture of a neural network may be designed to maximize performance and efficiency for particular processing tasks.

Moreover, neural networks may be implemented by specialized hardware (e.g., hardware accelerators) for performing specialized tasks with increased processing performance, reduced power consumption, etc. In some cases, hardware architectures (e.g., configurations of hardware accelerators) may be designed manually, using previous information, intuition, and a trial-and-error approach. The amount of design decisions may be large and may consider design metrics such as memory size, memory form factor, topology of multipliers, etc. In some examples, manual design approaches may provide working solutions. However, such solutions may not be optimized for different users or use cases. As a result, there is a need in the art for improved design techniques for optimization of neural network architectures and the corresponding hardware architectures.

SUMMARY

A method, apparatus, non-transitory computer readable medium, and system for neural architecture search (NAS) are described. Embodiments of the method, apparatus, non-transitory computer readable medium, and system are configured to select a value of a coarse dimension during a NAS using a controller based search algorithm, wherein the controller based search algorithm includes a policy function for selecting the value of the coarse dimension, identify a fine dimension for the NAS based at least in part on the value of the coarse dimension, select a value for the fine dimension during the NAS using a differential search algorithm, wherein the differential search algorithm is based on a loss function, and generate a neural network architecture based on the value of the coarse dimension and the value of the fine dimension.

DETAILED DESCRIPTION

Figure 1:
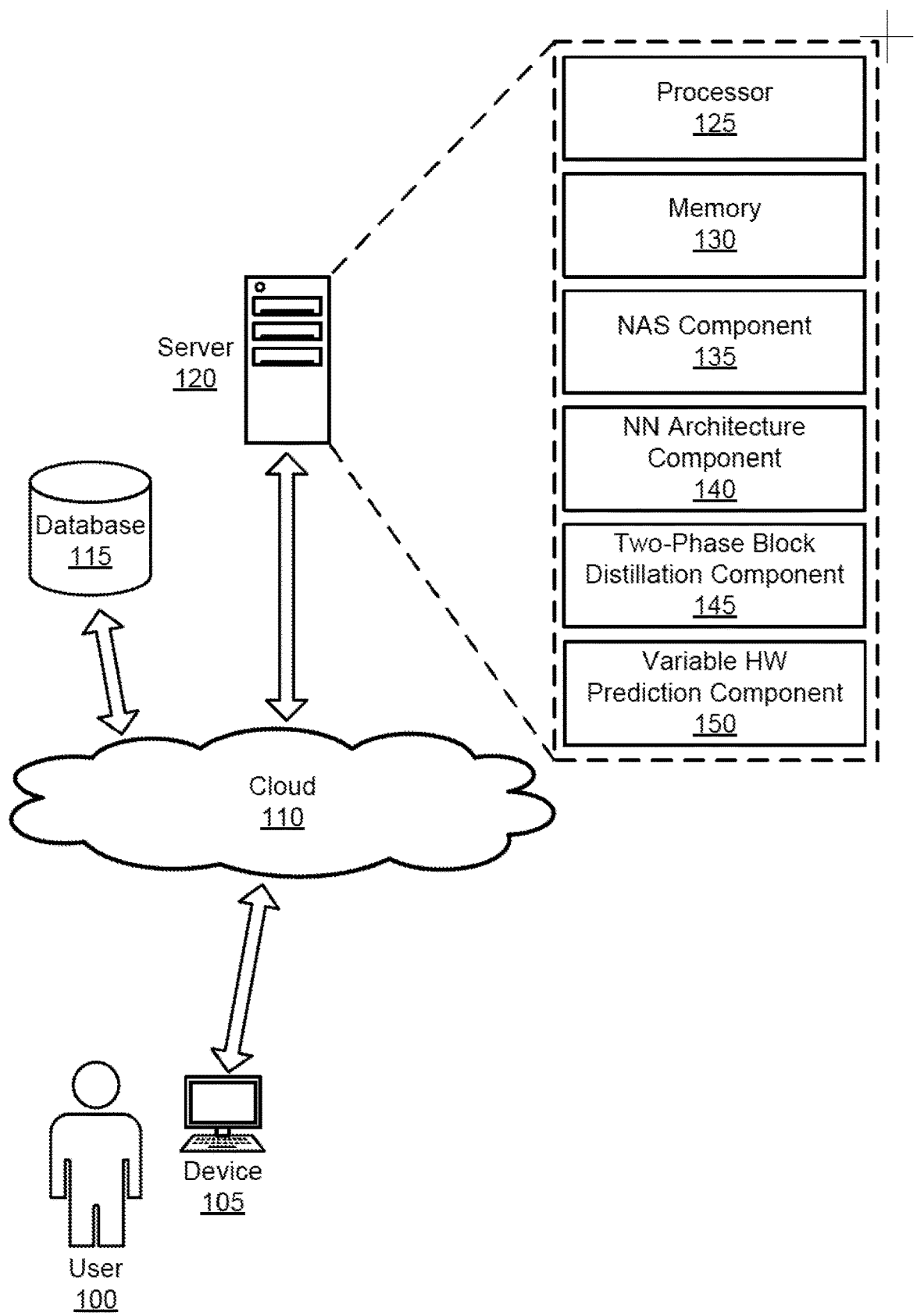
FIG. 1 shows an example of a system for coarse-to-fine neural architecture search (NAS) according to aspects of the present disclosure.

Various processing devices such as computers, smartphones, tablets, and wearables may implement neural network processing for more efficient and high-performing processing of specialized tasks. A neural network is a type of computer algorithm that is capable of learning specific patterns without being explicitly programmed. For instance, a neural network may learn specific patterns and perform specialized tasks through iterations over known data. A neural network is a form of data processing where input data or input signals are processed with a set of operations and grouped into layers. Each layer is parameterized by a set of operations, an order of the operations, and coefficients of the operations (e.g., which may be referred to as weights). Accordingly, a neural network comprises or refers to an architecture and weights, where the neural network architecture defined by multiple attributes, such as the number of layers, the size of each layer, the type of each layer, and the connectivity of each layer, among other factors.

For implementation of a neural network, general computation units such as Computational Processor Units (CPUs), Graphical Processor Units (GPUs) and Neural Processor Units (NPUs) may perform tasks using specific hardware architectures. As an example, a Specific Neural Processor (SNP) may be used for neural network processing, where a SNP may execute a specific network (e.g., a specific convolutional neural network (CNN), or another specific artificial neural network (ANN), etc.) with high efficiency. Hardware architectures (e.g., configurations of hardware accelerators) may be designed manually, using previous information, designer intuition, trial-and-error approaches, etc. In some cases, design decisions may be numerous and intensive and may consider design metrics such as memory size, memory form factor, number and topology of multipliers, etc.

Accordingly, optimization of both neural network architectures and hardware architectures may be desired for efficient and high-performing processing of specialized tasks. In some examples, efficiency of a neural network and hardware architecture are measured based on a combination of consumed power, performance and latency metrics, hardware area, etc. For instance, Neural Architecture Search (NAS) techniques may be implemented for automatic design of neural network architectures such that both performance of a task (e.g. neural network accuracy) and the expected efficiency (e.g., the resulting power, performance, and area (PPA) parameters) are optimized. In some cases, the design process is performed differentially. For example, the design process may be performed via a differential method by embedding the design space within a larger neural network and learning an inner connectivity specifying the obtained architecture. In other cases, the design process is performed via a controller based method by traversing possible architectures using a controller or policy.

Aspects of the present disclosure include techniques, which may be used separately or together, for efficient and high performance design of neural network architectures and corresponding hardware architectures. Techniques for co-design of hardware and neural network architectures using a coarse-to-fine search are described. For example, NAS techniques may implement a controller based method and a differential method in a coarse-to-fine manner (e.g., where coarse dimensions are selected using a controller based search algorithm and fine dimensions are selected using a differential method). Techniques for learning and training subnetworks of the neural network using a two-phase neural network block distillation method are also described. Further, the techniques described herein include neural hardware predictor techniques for a neural network to predict PPA for a variable hardware architecture and a variable neural network architecture. For instance, neural hardware predictor techniques may be used to design the neural network architecture and the hardware architecture based on predetermined or predicted PPA parameters.

FIG. 1 shows an example of a system for coarse-to-fine NAS according to aspects of the present disclosure. The example shown includes user 100, device 105, cloud 110, database 115, and server 120. The example of FIG. 1 illustrates one or more aspects of NAS techniques described herein. For instance, a user 100 may operate a device 105 connected to a cloud 110. The cloud 110 may access a database 115 and a server 120. In some examples, the server 120 may implement one or more aspects of the NAS techniques described herein. The example system of FIG. 1 is shown for illustrative purposes. The techniques described herein may be implemented in other systems by analogy, without departing from the scope of the present disclosure.

A computing device 105 is a personal computer, laptop computer, mainframe computer, palmtop computer, personal assistant, mobile device 105, or any other suitable processing apparatus.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers 120. A server 120 is designated an edge server 120 if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A database 115 is an organized collection of data. For example, a database 115 stores data in a specified format known as a schema. A database 115 may be structured as a single database, a distributed database, multiple distributed databases, or an emergency backup database. In some cases, a database 115 controller may manage data storage and processing in a database 115. In some cases, a user 100 interacts with a database controller. In other cases, a database controller may operate automatically without user 100 interaction.

A server 120 provides one or more functions to users 100 linked by way of one or more of the various networks. In some cases, the server 120 includes a single microprocessor board, which includes a microprocessor responsible for controlling all aspects of the server 120. In some cases, a server 120 uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server 120 is configured to send and receive hypertext markup language (HTML) formatted files (e.g., for displaying web pages). In various embodiments, a server 120 comprises a general purpose computing device, a personal computer, a laptop computer, a mainframe computer, a super computer, or any other suitable processing apparatus.

A processor 125 is an intelligent hardware device, (e.g., a general-purpose processing component, a digital signal processor (DSP), a CPU, a GPU, a microcontroller, an application specific integrated circuit (ASIC), a field programmable gate array (FPGA), a programmable logic device, a discrete gate or transistor logic component, a discrete hardware component, or any combination thereof). In some cases, the processor 125 is configured to operate a memory array using a memory controller. In other cases, a memory controller is integrated into the processor 125. In some cases, the processor 125 is configured to execute computer-readable instructions stored in a memory 130 to perform various functions. In some embodiments, a processor 125 includes special purpose components for modem processing, baseband processing, digital signal processing, or transmission processing.

Examples of a memory 130 include random access memory (RAM), read-only memory (ROM), or a hard disk. Examples of memory 130 include solid state memory and a hard disk drive. In some examples, memory 130 is used to store computer-readable, computer-executable software including instructions that, when executed, cause a processor 125 to perform various functions described herein. In some cases, the memory 130 contains, among other things, a basic input/output system (BIOS) which controls basic hardware or software operation such as the interaction with peripheral components or devices 105. In some cases, a memory controller operates memory cells. For example, the memory controller can include a row decoder, column decoder, or both. In some cases, memory cells within a memory 130 store information in the form of a logical state.

Software may include code to implement aspects of the present disclosure. Software may be stored in a non-transitory computer-readable medium such as system memory 130 or other memory 130. In some cases, the software may not be directly executable by the processor 125 but may cause a computer (e.g., when compiled and executed) to perform functions described herein.

In one embodiment, server 120 includes processor 125, memory 130, NAS component 135, NN architecture component 140, two-phase block distillation component 145, and variable hardware (HW) prediction component 150.

According to some embodiments, NAS component 135 selects a value of a coarse dimension during a NAS using a controller based search algorithm, where the controller based search algorithm includes a policy function for selecting the value of the coarse dimension. In some examples, NAS component 135 identifies a fine dimension for the NAS based on the value of the coarse dimension. In some examples, NAS component 135 selects a value for the fine dimension during the NAS using a differential search algorithm, where the differential search algorithm is based on a loss function. In some examples, the coarse dimension includes a number of layers, a layer type, a layer connectivity, or any combination thereof. In some examples, the fine dimension includes a layer size, a number of channels, a filter size, a cell size, a gate size, an activation function, or any combination thereof. In some examples, the controller based search algorithm includes a reinforcement learning algorithm or an evolutionary search algorithm.

According to some embodiments, NN architecture component 140 generates a neural network architecture based on the value of the coarse dimension and the value of the fine dimension.

According to some embodiments, two-phase block distillation component 145 configures a block of a neural network based on the NAS. In some examples, two-phase block distillation component 145 computes a first loss function based on an intermediate output of the block using a first loss function. In some examples, two-phase block distillation component 145 updates the NAS for the block based on the first loss function. In some examples, two-phase block distillation component 145 computes a second loss function using a final output of the neural network after updating NAS based on the first loss function. In some examples, two-phase block distillation component 145 updates the NAS for the neural network based on the second loss function.

According to some embodiments, variable HW prediction component 150 identifies neural architecture parameters including the value of the coarse dimension and the value of the fine dimension. In some examples, variable HW prediction component 150 identifies a set of hardware parameters. In some examples, variable HW prediction component 150 predicts PPA parameters using a variable hardware predictor. In some examples, variable HW prediction component 150 iteratively updates the neural architecture parameters and the hardware parameters based on the predicted PPA parameters. In some examples, variable HW prediction component 150 generates a hardware design based on the updated hardware parameters. In some examples, variable HW prediction component 150 selects the hardware parameters using a neural network trained using the differential training algorithm.

Figure 2:
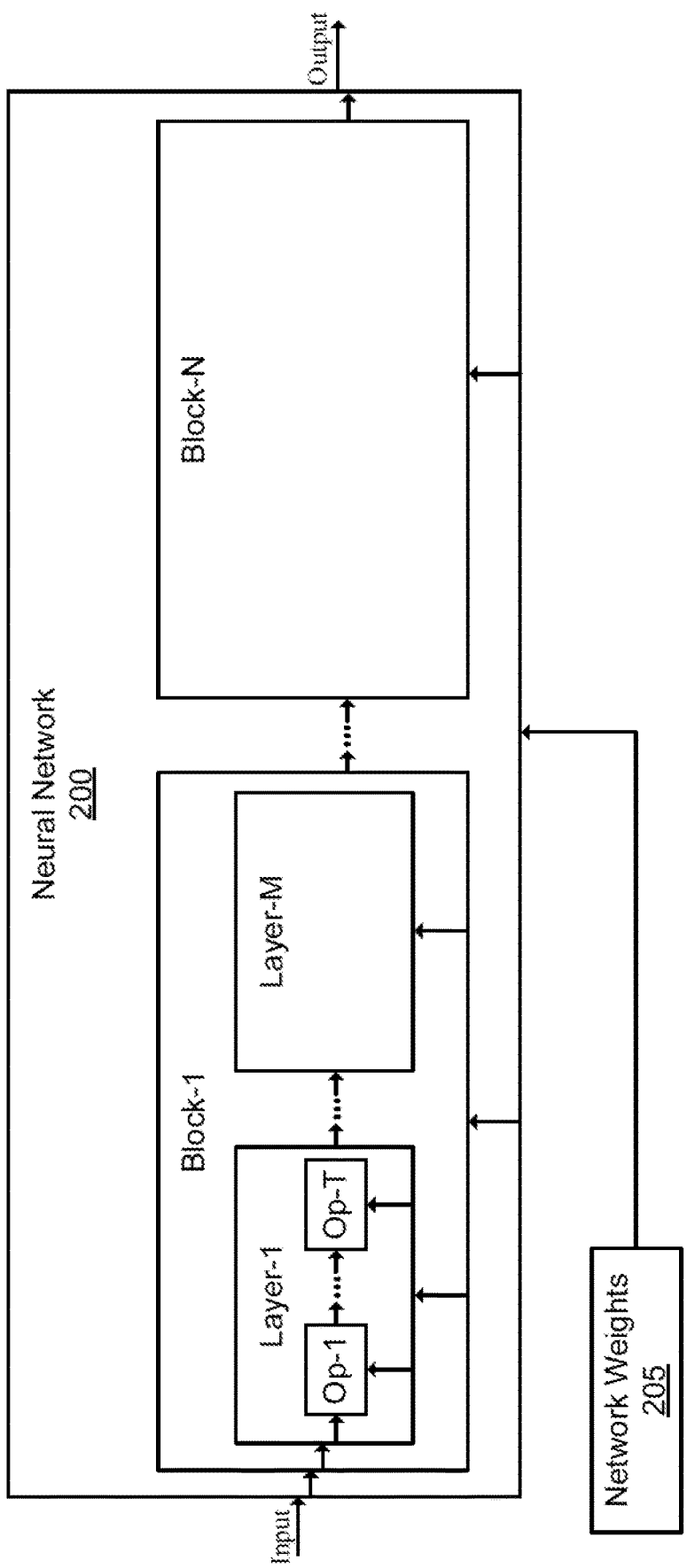
FIG. 2 shows an example of a neural network according to aspects of the present disclosure.

FIG. 2 shows an example of a neural network 200 according to aspects of the present disclosure. The example shown includes neural network 200 and network weights 205. Neural network 200 is an example of, or includes aspects of, the corresponding element described with reference to FIGS. 4, 5, 8, 11, 13, and 14. Network weights 205 is an example of, or includes aspects of, the corresponding element described with reference to FIGS. 5 and 8.

A neural network 200 is a type of computer algorithm that is capable of learning specific patterns without being explicitly programmed, but through iterations over known data. A neural network 200 may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

A neural network 200 is generally comprised of an architecture of layers and network weights 205. Accordingly, a neural network 200 is a form of data processing, where input data or input signals are processed with a set of operations and grouped into layers. Each layer is parameterized by a set of operations, an order of the operations, and coefficients of the operations (e.g., which may be referred to as network weights 205). For instance, a neural network architecture of neural network 200 may include N blocks, where each block may include one or more layers (e.g., 'Block-1' may include M layers). Further, each layer may include one or more operations (e.g., 'layer-1' may include T operations ('Op-1' through 'Op-T')). Accordingly, each layer of neural network 200 architecture may be parameterized with coefficients of the operations within the layer (e.g., layers may be associated with a corresponding coefficient or weighting of network weights 205).

In some examples, neural network 200 may include or refer to an ANN. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, neural network 200 may include or refer to a CNN. A CNN is a class of neural network that is used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

The present disclosure provides systems and methods for machine learning and hardware design. More particularly, embodiments of the present disclosure provide techniques for designing both a neural network 200 and corresponding hardware. Embodiments of the present disclosure provide neural network architectures (e.g., architectures of a neural network 200) and hardware architectures simultaneously and to increase prevailing design methods of both neural network architectures and hardware architectures.

As described, neural network 200 may be used to process data for various tasks. The architectures of neural networks 200 are designed to optimize performance and efficiency. In some cases, the design process is performed differentially (e.g., as further described herein, for example, with reference to FIG. 4). For example, the design process may be performed by embedding the design space within a larger neural network and learning an inner connectivity specifying the obtained architecture. In other cases, the design process is performed by traversing possible architectures using a controller or policy (e.g., as further described herein, for example, with reference to FIG. 6). Additionally or alternatively, due to the intractability of the design space, some methods optimize subnetworks (e.g., which may be referred to as neural network blocks) of the neural network 200 one at a time (e.g., as further described herein, for example, with reference to FIG. 8). These methods may compare subnetworks alternatives against each other or may compare versions of the neural network 200 with different subnetwork alternatives.

Hardware devices, such as an ASIC, are designed to execute applications while optimizing efficiency. Efficiency may be measured as a combination of consumed power, performance/latency, and the resulting area (e.g., which may be referred to as PPA parameters). When an application uses a neural network 200, a design process may consider efficiency in the calculations. With the absence of a hardware design, optimization may consider a metric other than PPA, impeding the optimization process. The optimization of both neural network 200 and hardware architectures may be addressed serially and may use a simultaneous co-design solution.

Embodiments of the present disclosure provide neural network architectures and hardware architectures (e.g., simultaneously, or separately) in a differential manner to combine two methods for neural network architecture design and to combine two methods of subnetwork (e.g., neural network block) training. Hardware devices designed to execute a specific neural network are described by a set of hardware parameters, such as the number of multiple accumulation (MAC) units and the size of static random access memory (SRAM). The efficiency of a hardware architecture is measured by PPA.

Figure 3:
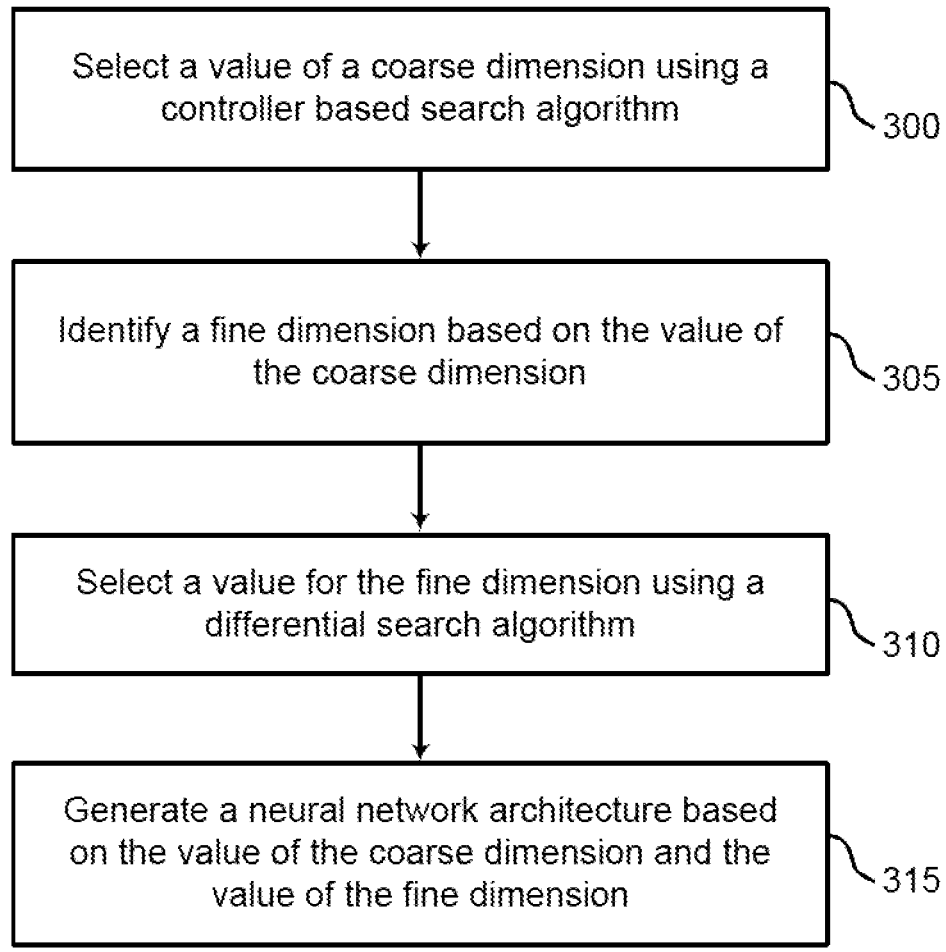
FIG. 3 shows an example of a process for a NAS according to aspects of the present disclosure.

FIG. 3 shows an example of a process for a NAS according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. The coarse-to-fine NAS method of the present disclosure improves the speed of NAS and is more likely to converge (e.g., compared to standalone controller-based methods). In some examples, the coarse-to-fine NAS method of the present disclosure improves NAS flexibility and can be applied to more arbitrary architecture parameters (e.g., compared to standalone differential NAS).

At operation 300, the system selects a value of a coarse dimension during a NAS using a controller based search algorithm, where the controller based search algorithm includes a policy function for selecting the value of the coarse dimension. Coarse dimensions of a neural network may include a number of layers, a layer type, and a layer connectivity, among other examples. In some examples, the controller based search algorithm includes a reinforcement learning algorithm or an evolutionary search algorithm. In some cases, the operations of this step refer to, or may be performed by, a NAS component as described with reference to FIG. 1. Aspects of operation 300 are further described herein, for example, with reference to FIG. 4.

At operation 305, the system identifies a fine dimension for the NAS based on the value of the coarse dimension. Fine dimensions of a neural network may include a layer size, a number of channels, a filter size, a cell size, a gate size, an activation function, among other examples In some cases, the operations of this step refer to, or may be performed by, a NAS component as described with reference to FIG. 1. Aspects of operation 305 are further described herein, for example, with reference to FIG. 5.

At operation 310, the system selects a value for the fine dimension during the NAS using a differential search algorithm, where the differential search algorithm is based on a loss function. In some cases, the operations of this step refer to, or may be performed by, a NAS component as described with reference to FIG. 1. Aspects of operation 310 are further described herein, for example, with reference to FIG. 6.

At operation 315, the system generates a neural network architecture based on the value of the coarse dimension and the value of the fine dimension. In some cases, the operations of this step refer to, or may be performed by, a NN architecture component as described with reference to FIG. 1. Aspects of operation 315 are further described herein, for example, with reference to FIG. 5.

Figure 4:
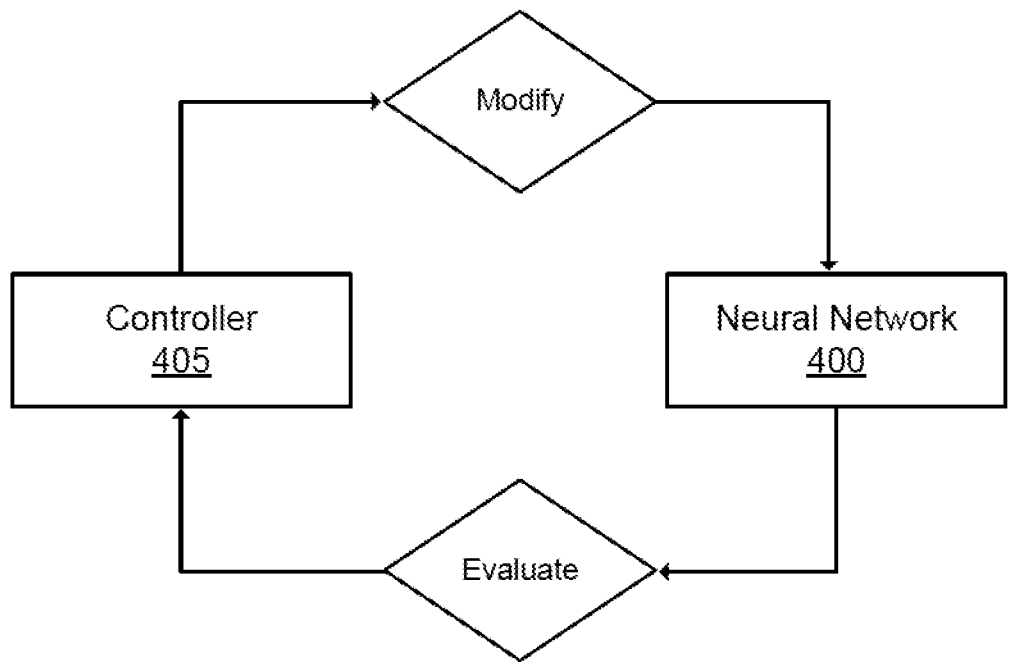
FIG. 4 shows an example of a NAS component according to aspects of the present disclosure.

FIG. 4 shows an example of a NAS component performing one or more aspects of controller based NAS according to aspects of the present disclosure. The example NAS component of FIG. 4 is an example of, or includes aspects of, the corresponding element described with reference to FIG. 1. The example shown includes neural network 400 and controller 405.

Neural network 400 may implement a differential based algorithm, and may be an example of, or includes aspects of, the corresponding element described with reference to FIGS. 2, 5, 8, 11, 13, and 14. Controller 405 may implement a controller based algorithm and may be an example of, or includes aspects of, the corresponding element described with reference to FIGS. 6 and 14. In some cases, controller 405 may be referred to as a policy.

As described herein, neural network architectures may be defined by multiple attributes, such as the number of layers, the size of each layer, the type of each layer, the connectivity of each layer, and other factors. NAS methods may operate in an intractable search space that is spanned by a set of dimensions formed by such neural network architecture attributes. NAS methods may provide for automatic design of neural network architectures such that both performance of a task (e.g., neural network output accuracy) and the expected efficiency (e.g., the resulting power, performance, and area (PPA) parameters) are optimized. In some cases, NAS methods may implement controller based learning techniques such as reinforcement learning or evolutionary learning. In other examples, NAS methods are based on differential algorithm-based techniques.

For instance, in the example of FIG. 4, NAS methods rely on a controller 405 (e.g., a controller/policy) using a predefined or learned policy. Such NAS methods may include reinforcement learning and evolutionary algorithms or genetic algorithms. Such controller based NAS methods traverse the search space by individually considering neural network candidates (e.g., candidates for the neural network 400), where each candidate is trained and evaluated. As a result, controller based NAS methods may be performed on a general search space with minimal limitations. In some examples, controller based NAS methods are trained such that the output is determined to be within a threshold of a desired output.

However, controller based NAS methods may be computationally intensive (e.g., associated with high search costs) and may struggle to obtain a convergence (e.g., convergence to be within a threshold of the desired output). Therefore, controller based NAS methods may have improved performance when searching along dimensions with limited options (e.g., limited options that may have weak relationships), such as coarse dimensions. For example, controller based NAS methods may be suitable for searching layer types within a neural network where the layer types may have weak relationships.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

Genetic learning and evolutionary learning may include algorithms and computations based on genetics and biological evolutionary (e.g., such as mutation, selection, reproduction, recombination, etc.). Candidate solutions to a specialized task (e.g., outcomes of an optimization problem) may be analogous to off-springs in such biological evolution mechanisms. For instance, evolutionary learning may include mutating neural network 400 and analyzing such mutations to produce better off-springs, which are also evaluated by accuracy on validation set. In some examples, evolutionary learning may not make assumptions about underlying fitness landscape (e.g., relationship between genotypes and reproductive success) when approximating solutions to problems.

Figure 5:
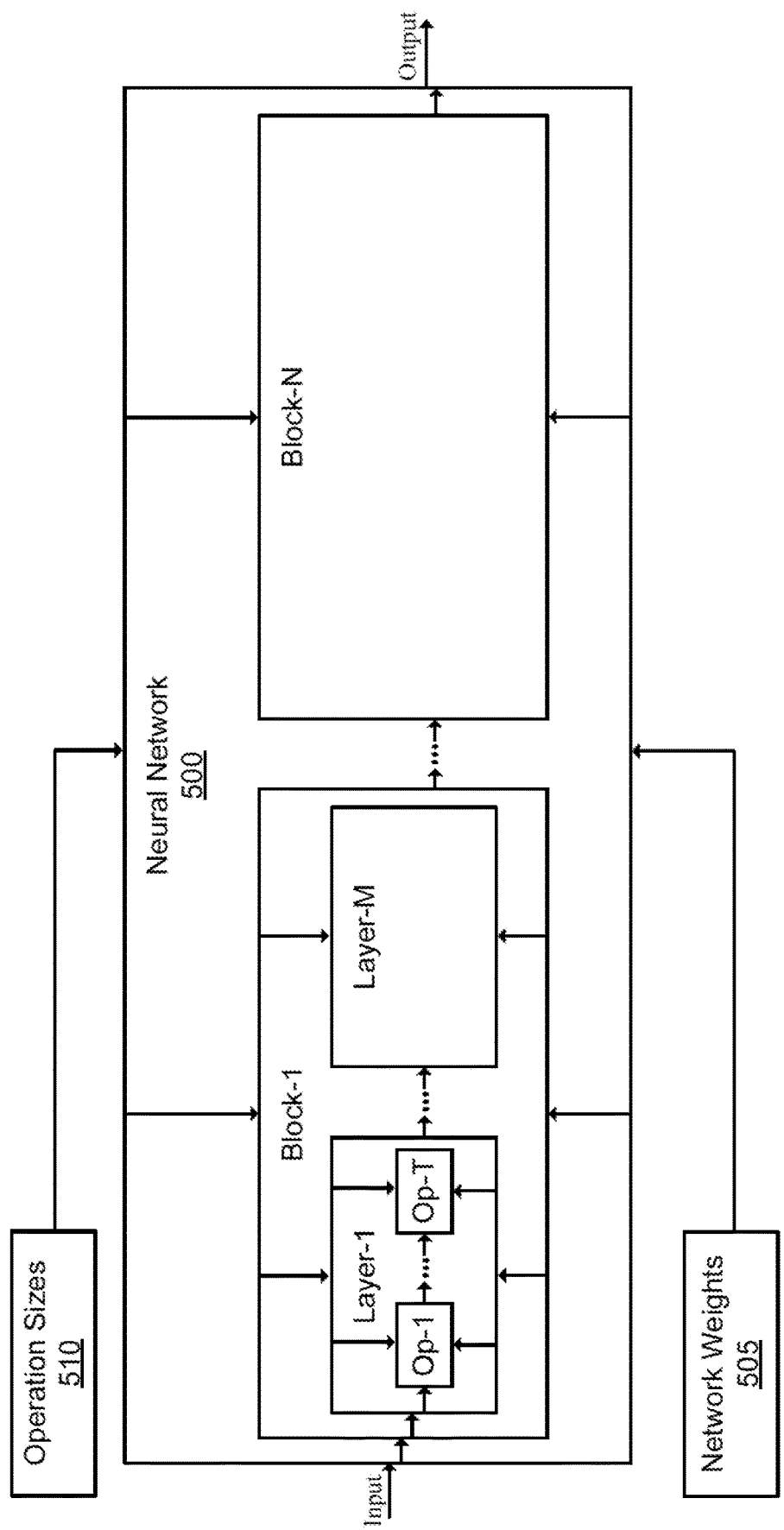
FIG. 5 shows an example of a differential NAS according to aspects of the present disclosure.

FIG. 5 shows an example of a differential NAS (e.g., for a neural network architecture of neural network 500) according to aspects of the present disclosure. The example shown includes neural network 500, network weights 505, and operation size information 510. Neural network 500 is an example of, or includes aspects of, the corresponding element described with reference to FIGS. 2, 4, 8, 11, 13, and 14. Network weights 505 is an example of, or includes aspects of, the corresponding element described with reference to FIGS. 2 and 8.

As described herein, differential NAS methods learn neural network architecture in a similar fashion to the learning process of neural networks, where the parameters defining the architectures are trained similarly to the training of network weights 505 (e.g., according to a loss function). In practice, a larger network is composed, where parameters (e.g., operation size information 510) control different neural network architectures within the larger network. As a result, the network architecture is obtained with a single training process and speed may be increased compared to controller based NAS approaches. Furthermore, the convergence of the network architecture may be increased (e.g., well defined, more likely, etc.). However, such methods can be operated in a reduced (e.g., limited) search space governed by the containing network. For these reasons, differential NAS methods are suitable for searching along dimensions whose options are closely related (e.g., fine dimensions), such as the number of neurons in a layer that has a continuous nature.

Figure 6:
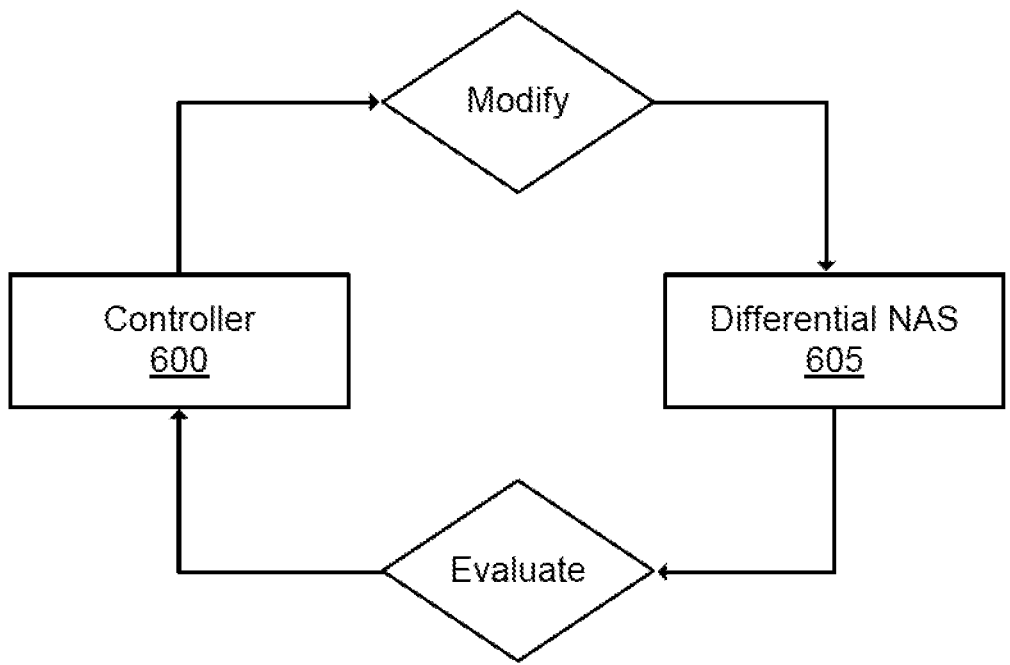
FIG. 6 shows an example of a NAS component according to aspects of the present disclosure.

FIG. 6 shows an example of a NAS component performing one or more aspects of coarse-to-fine NAS according to aspects of the present disclosure. The example NAS component of FIG. 6 is an example of, or includes aspects of, the corresponding element described with reference to FIG. 1. The example shown includes controller 600 and differential NAS 605. Controller 600 is an example of, or includes aspects of, the corresponding element described with reference to FIGS. 4 and 14. In some cases, controller 600 may be referred to as a policy.

As described herein, embodiments of the present disclosure use a controller based method and a differential method in a coarse-to-fine manner. The dimensions of the NAS search space may be divided into two groups, a first group with dimensions (e.g., coarse dimensions) that may be used with controller based methods and a second group with dimensions (e.g., fine dimensions) that may be used with differential methods. Coarse-to-fine NAS may be performed using a controller based method on the first group by iteratively altering the values along the dimensions of the first group according to a policy (e.g., via a controller 600). A sub-search space spanned by the dimensions of the second group is then generated. Then, differential NAS may be performed to obtain a value configuration of the second group (e.g., via a differential NAS component 605).

Figure 7:
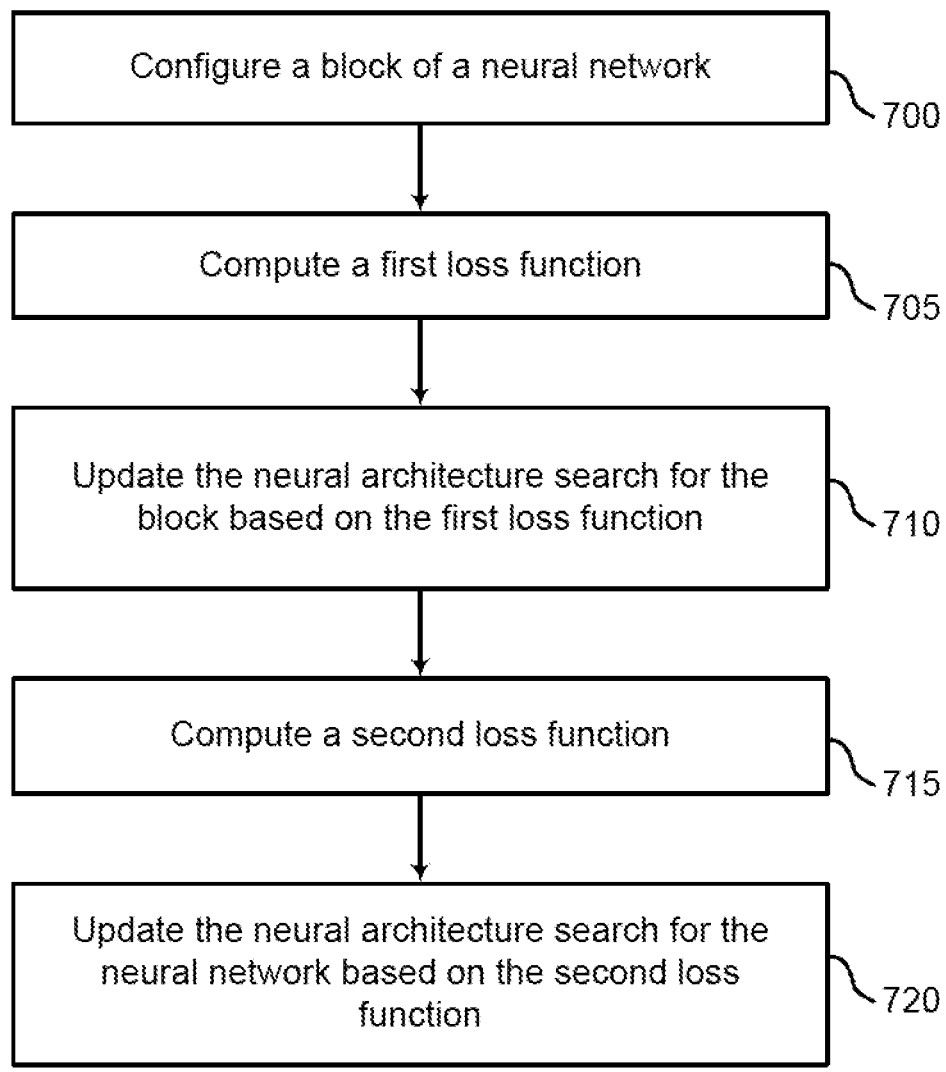
FIG. 7 shows an example of a process for a two-phase block NAS according to aspects of the present disclosure.

FIG. 7 shows an example of a process for a two-phase block NAS according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. The two-phase block NAS method of the present disclosure improves NAS speed (e.g., compared to block NAS methods that consider outer output alone) and may lead to a more efficient network architecture (e.g., compared to methods that consider inner output alone).

At operation 700, the system configures a block of a neural network based on a NAS. In some cases, the operations of this step refer to, or may be performed by, a two-phase block distillation component as described with reference to FIG. 1.

At operation 705, the system computes a first loss function based on an intermediate output (e.g., an inner output) of the block using a first loss function. In some cases, the operations of this step refer to, or may be performed by, a two-phase block distillation component as described with reference to FIG. 1.

At operation 710, the system updates the NAS for the block based on the first loss function. In some cases, the operations of this step refer to, or may be performed by, a two-phase block distillation component as described with reference to FIG. 1.

At operation 715, the system computes a second loss function using a final output (e.g., an outer output) of the neural network after updating NAS based on the first loss function. In some cases, the operations of this step refer to, or may be performed by, a two-phase block distillation component as described with reference to FIG. 1.

At operation 720, the system updates the NAS for the neural network based on the second loss function. In some cases, the operations of this step refer to, or may be performed by, a two-phase block distillation component as described with reference to FIG. 1.

Figure 8:
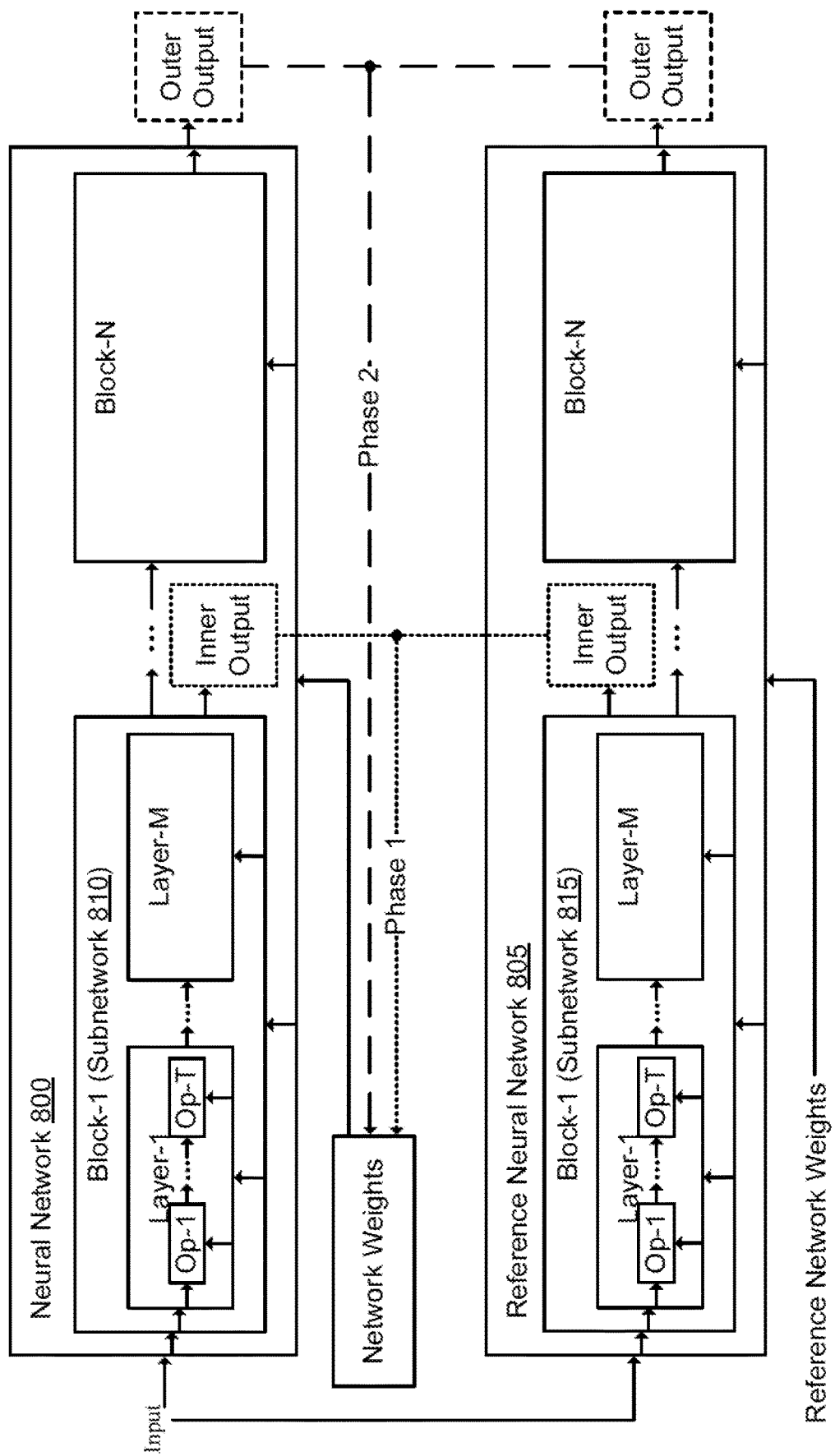
FIG. 8 shows an example of a two-phase block NAS according to aspects of the present disclosure.

FIG. 8 shows an example of a two-phase block NAS according to aspects of the present disclosure. The example shown includes neural network 800, reference neural network 805, subnetwork 810, and subnetwork 815. Neural network 800 is an example of, or includes aspects of, the corresponding element described with reference to FIGS. 2, 4, 5, 11, 13, and 14. In some examples, subnetwork 810 and subnetwork 815 may be referred to as neural network blocks and may be examples of, or includes aspects of, the corresponding element described with reference to FIGS. 2 and 5.

NAS methods alter the neural network architecture and compare versions of the neural network architecture according to the performance of a task for each version. NAS methods are trained such that the output is determined to be within a threshold of a desired output (e.g., which may be referred to as convergence). NAS methods may operate iteratively on subnetworks within the neural network, facilitating the search process. Such subnetworks may be referred to as blocks (e.g., neural network blocks) and can be regarded as inner subnetworks within the original outer network. When altering an inner subnetwork, the search process may focus on optimizing the inner output (e.g., the output of the inner subnetwork) or the outer output (e.g., the output of the outer network).

Knowledge distillation techniques may be performed to optimize the inner output using a reference inner output of another network (e.g., such as reference neural network 805). Optimizing the outer output may be performed with either knowledge distillation techniques or the training process of the outer neural network (e.g., neural network 800). Using the inner output expedites the training process while optimizing related objectives. The inner output may deviate from a reference network (e.g., reference neural network 805) while still optimizing the outer output. Using the outer output may target the ultimate network architecture (e.g., the ultimately selected outer network of neural network 800), but may use a greater computational effort and convergence may be reduced in some cases.

Embodiments of the present disclosure perform NAS for blocks (e.g., subnetwork 810) within a neural network (e.g., neural network 800) in two phases. In a first phase ('Phase 1'), the inner output is considered alone, performing some or all of the training and reducing convergence risks. The first phase is described in more detail herein, for example, with reference to operations 705 and 710 of FIG. 7. In a second phase (e.g., 'Phase 2'), the outer output is then considered, deviating from the inner output to optimize the outer output. The second phase is described in more detail herein, for example, with reference to operations 715 and 720 of FIG. 7. Performing NAS for blocks within a neural network is faster with improved results compared to using the outer output or the inner output individually.

In some examples, two-phase block NAS techniques may be merged (e.g., performed together) with coarse-to-fine NAS techniques. A controller based NAS method can be used to alter (e.g., and select) blocks within a neural network, where some of the parameters of the blocks are found using a differential NAS method. The differential search is then performed in two phases (e.g., 'Phase 1' and 'Phase 2' after controller based block alteration), where the inner output is used first and the outer output is used afterwards.

Figure 9:
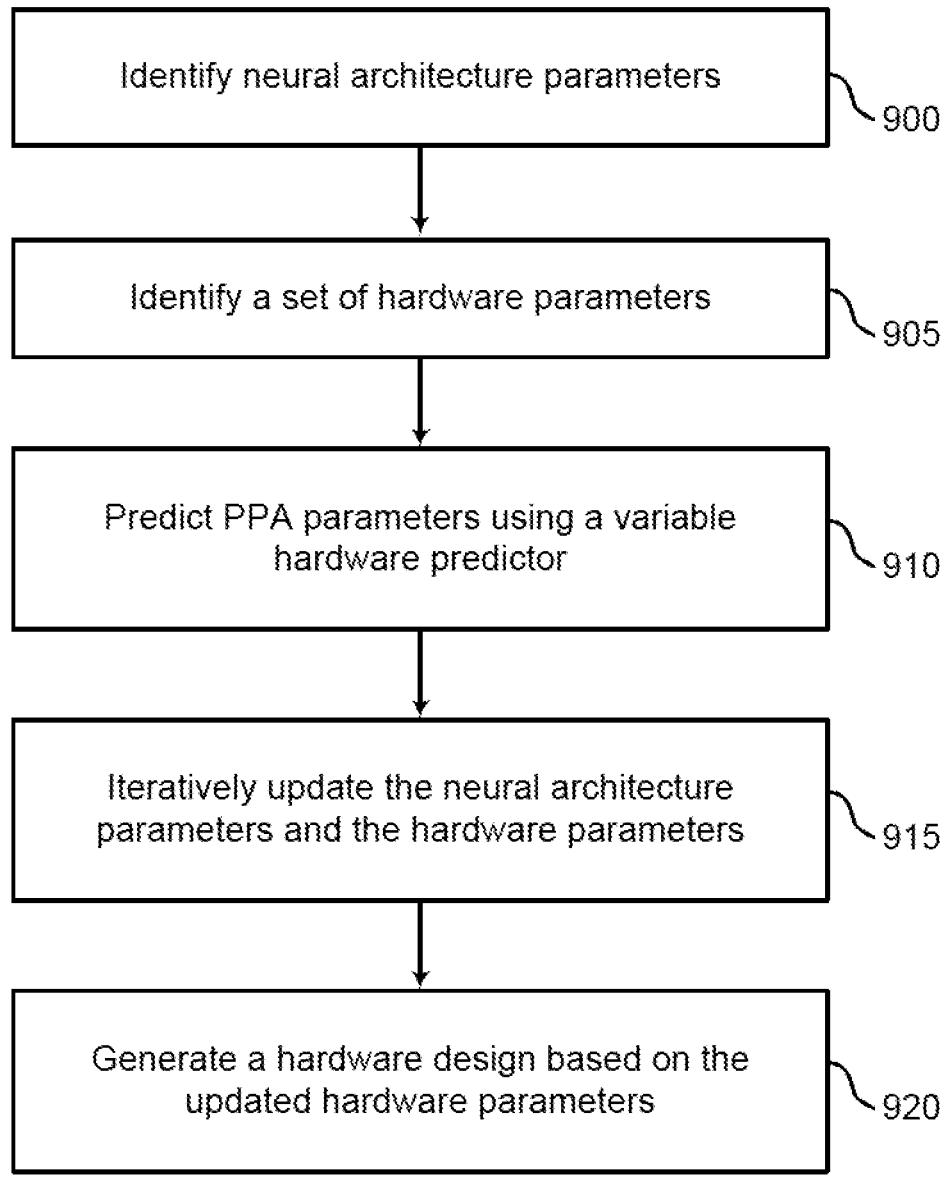
FIG. 9 shows an example of a process for variable hardware prediction according to aspects of the present disclosure.

FIG. 9 shows an example of a process for variable hardware prediction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. The variable hardware predictor of the present disclosure provides training a predictor once for multiple hardware architectures (e.g., compared to using a specific hardware predictor). The variable hardware predictor increases generalization compared to using a specific hardware predictor. The variable hardware predictor of the present disclosure learns network architecture according to PPA and enables a differential hardware design (e.g., while other methods rely on metrics that may not resemble PPA). In some examples, learning network architecture and hardware architecture may be provided simultaneously.

At operation 900, the system identifies neural architecture parameters including the value of the coarse dimension and the value of the fine dimension. In some cases, the operations of this step refer to, or may be performed by, a variable HW prediction component as described with reference to FIG. 1.

At operation 905, the system identifies a set of hardware parameters. In some cases, the operations of this step refer to, or may be performed by, a variable HW prediction component as described with reference to FIG. 1.

At operation 910, the system predicts PPA parameters using a variable hardware predictor. In some cases, the operations of this step refer to, or may be performed by, a variable HW prediction component as described with reference to FIG. 1.

At operation 915, the system iteratively updates the neural architecture parameters and the hardware parameters based on the predicted PPA parameters. In some examples, the hardware parameters may be selected using a neural network trained using the differential training algorithm. In some cases, the operations of this step refer to, or may be performed by, a variable HW prediction component as described with reference to FIG. 1.

At operation 920, the system generates a hardware design based on the updated hardware parameters. In some cases, the operations of this step refer to, or may be performed by, a variable HW prediction component as described with reference to FIG. 1.

Neural network architectures are designed to optimize both task performance and efficiency. However, efficiency may be calculated using PPA parameters for hardware designed for a fixed neural network architecture (e.g., where the fixed neural network architecture may differ from a neural network architecture selected as a result of a NAS). Dual-optimization (e.g., of a neural network architecture and hardware) may be addressed serially, for example, using an alternative metric for PPA. In some examples, such a metric (e.g., metrics alternative to PPA parameters) may result in a suboptimal network architecture and in turn a hardware fitted to a suboptimal network.

In some cases, the optimization processes are performed iteratively, repeatedly adjusting the hardware architecture and optimizing the neural network architecture (e.g., the neural network architecture versions), followed by fixing the neural network architecture and optimizing the hardware architecture. When the hardware architecture is fixed, the exact PPA may be retrieved during the optimization of the neural network architecture. Such retrieval uses a compiler execution, which may be time-consuming. In addition, the optimization may be performed in a process different than the neural network architecture optimization process.

FIGS. 10-13 show examples of variable hardware predictor training and usage with differential NAS according to aspects of the present disclosure. For instance, predictor network 1000, predictor network 1105, predictor network 1200, and predictor network 1305 may be trained and used with differential NAS for predicting PPA parameters of corresponding neural network architecture parameters.

For example, some methods use a neural network trained to predict PPA for a certain hardware and a variable neural network architecture, which may be referred to as a neural hardware predictor. The neural hardware predictor may be trained over a dataset collected using the original compiler-based PPA retrieval process. The neural hardware predictor receives a neural network architecture as an input and outputs PPA (e.g., to train predictor network weights). Such predictor may be used seamlessly with the original neural network and for differential end-to-end training.

Embodiments of the present disclosure train a variable hardware predictor (e.g., predictor network 1000, predictor network 1105, predictor network 1200, and predictor network 1305), receiving a neural network architecture (e.g., 'Network Architecture Parameters') and a hardware architecture (e.g., implicit or explicit 'HW Parameters') as input. The variable hardware predictor outputs PPA metrics. For a design process that considers both neural network architecture and hardware architecture, the variable hardware predictor may be trained one or more times, and may lead to increased generalization. Additionally or alternatively, the present disclosure trains a variable hardware predictor that receives a neural network architecture without explicit hardware parameters (e.g., as described with reference to FIGS. 12 and 13). The predictor may learn to consider various hardware architectures.

Moreover, embodiments of the present disclosure (e.g., differential hardware design techniques) utilize a variable hardware predictor to design hardware architectures. The parameters are tuned and trained by which architectures are described and which are part of the input to the predictor. The parameters can be trained by various methods used for training a neural network. Further embodiments of the present disclosure design hardware and neural network architecture simultaneously using a variable hardware predictor, where of the predictor's input parameter types, (i.e., the neural network architecture parameters and the hardware architecture parameters) are trained and learned according to a single objective (e.g., based on PPA parameters, convergence threshold, etc.).

The differential hardware design of the present disclosure improves the speed of hardware design methods and is more likely to converge (e.g., compared to standalone controller-based hardware design methods). Differential hardware design may be performed simultaneously with network architecture learning.

Figure 10:
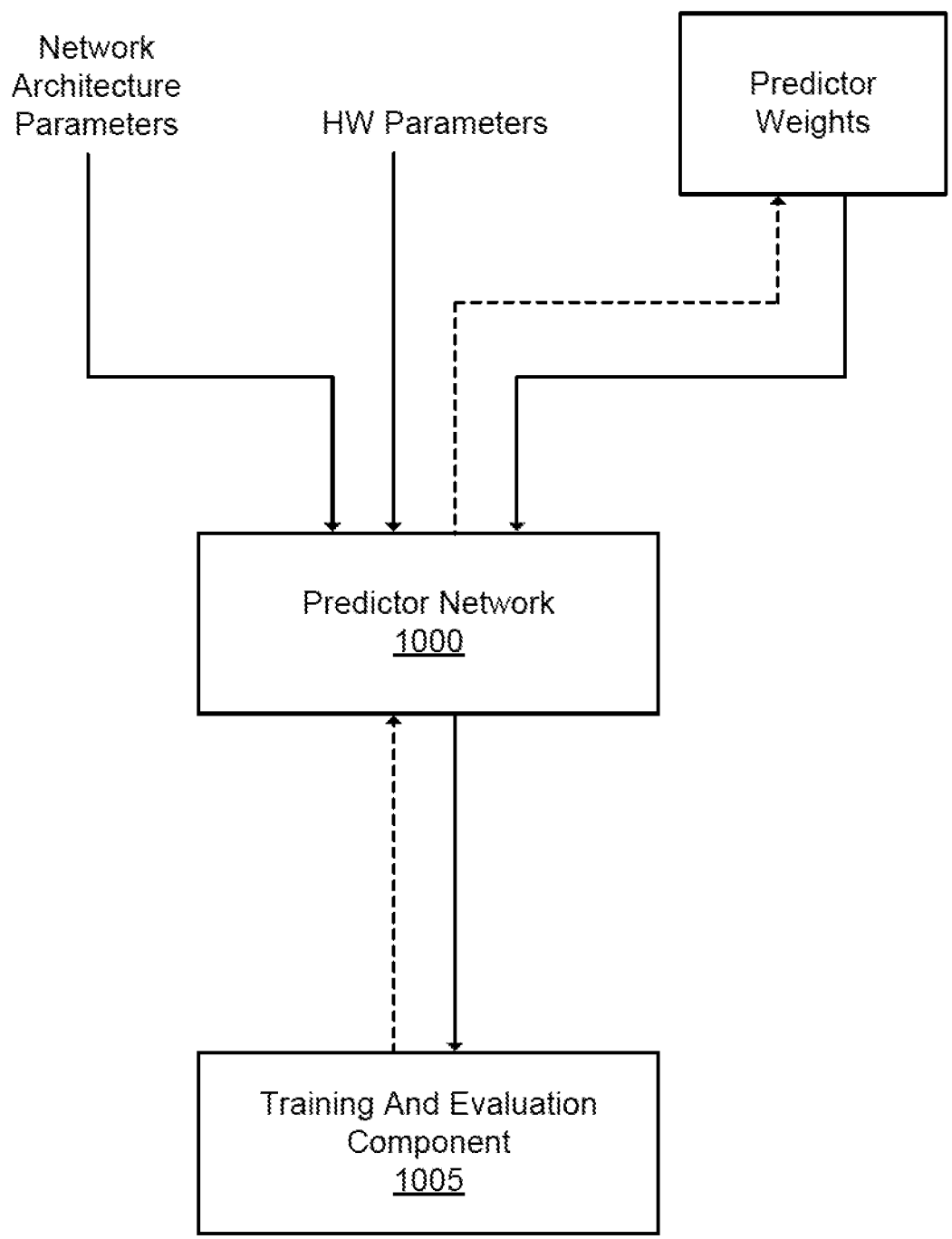
FIGS. 10 through 13 show examples of variable hardware predictor training and usage with differential NAS according to aspects of the present disclosure.

FIG. 10 shows an example of variable hardware predictor training phase according to aspects of the present disclosure. The example shown includes predictor network 1000 and training and evaluation component 1005. Predictor network 1000 is an example of, or includes aspects of, the corresponding element described with reference to FIGS. 11-13. Training and evaluation component 1005 is an example of, or includes aspects of, the corresponding element described with reference to FIGS. 11-13. In some aspects, FIG. 10 may illustrate a variable hardware predictor training phase with explicit hardware parameters.

Figure 11:
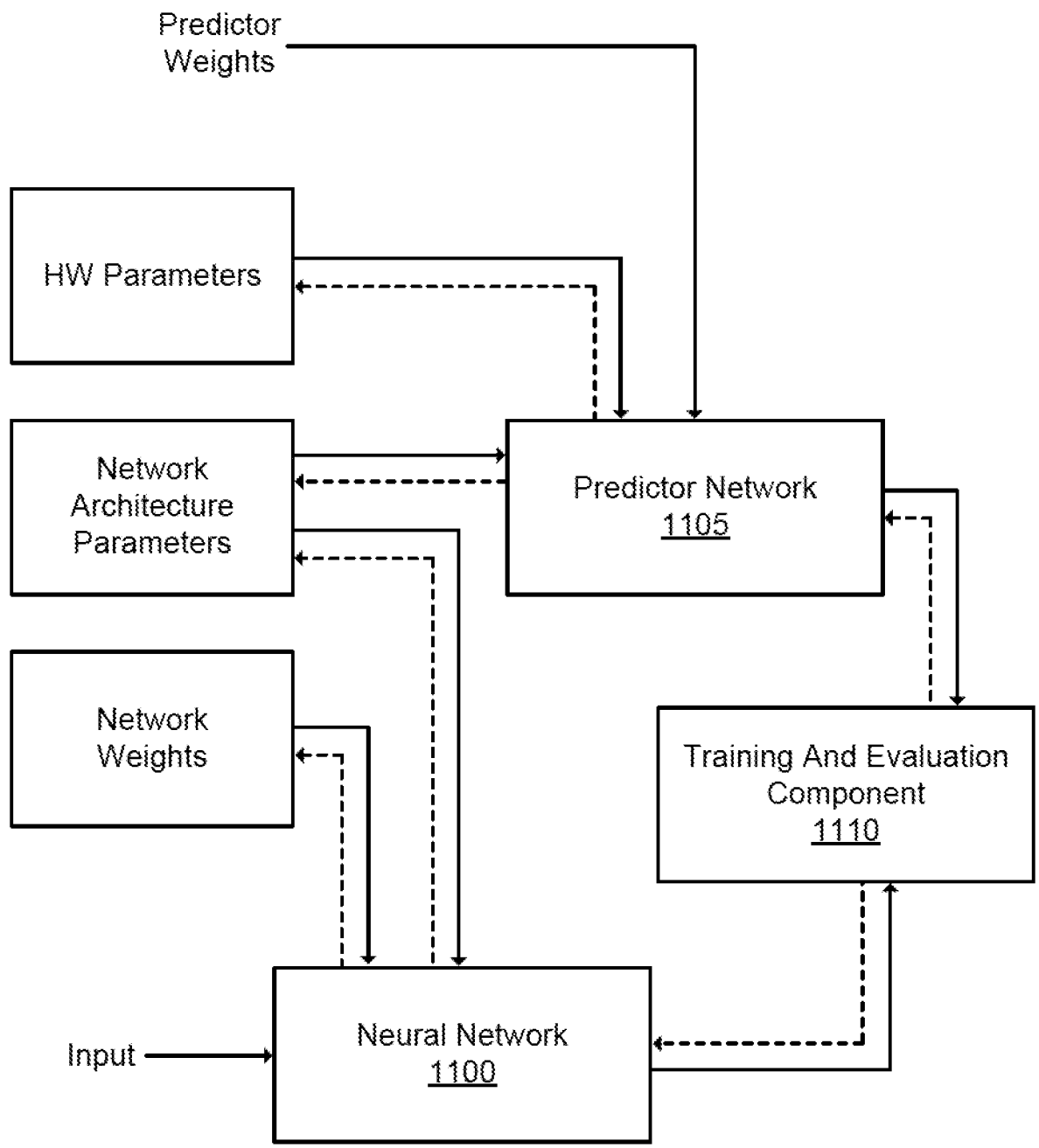

FIG. 11 shows an example of variable hardware predictor usage with differential NAS according to aspects of the present disclosure. The example shown includes neural network 1100, predictor network 1105, and training and evaluation component 1110. Neural network 1100 is an example of, or includes aspects of, the corresponding element described with reference to FIGS. 2, 4, 5, 8, 13, and 14. Predictor network 1105 is an example of, or includes aspects of, the corresponding element described with reference to FIGS. 10, 12, and 13. Training and evaluation component 1110 is an example of, or includes aspects of, the corresponding element described with reference to FIGS. 10, 12, and 13. In some aspects, FIG. 11 may illustrate a variable hardware predictor usage with differential NAS and explicit hardware parameters.

Figure 12:
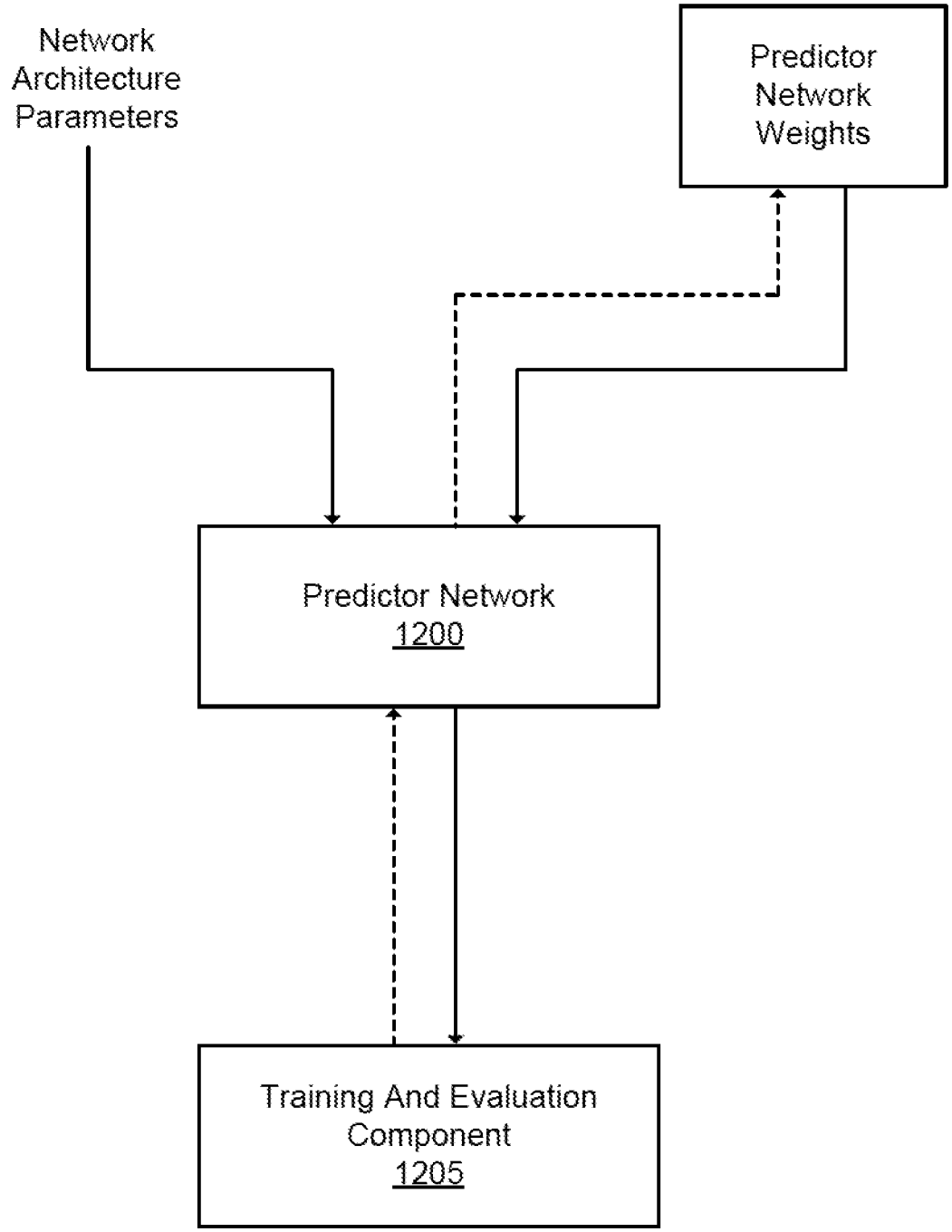

FIG. 12 shows an example of variable hardware predictor training phase according to aspects of the present disclosure. The example shown includes predictor network 1200 and training and evaluation component 1205. Predictor network 1200 is an example of, or includes aspects of, the corresponding element described with reference to FIGS. 10, 11, 13, and 14. Training and evaluation component 1205 is an example of, or includes aspects of, the corresponding element described with reference to FIGS. 10, 11, and 13. In some aspects, FIG. 12 may illustrate a variable hardware predictor training phase with implicit hardware parameters.

Figure 13:
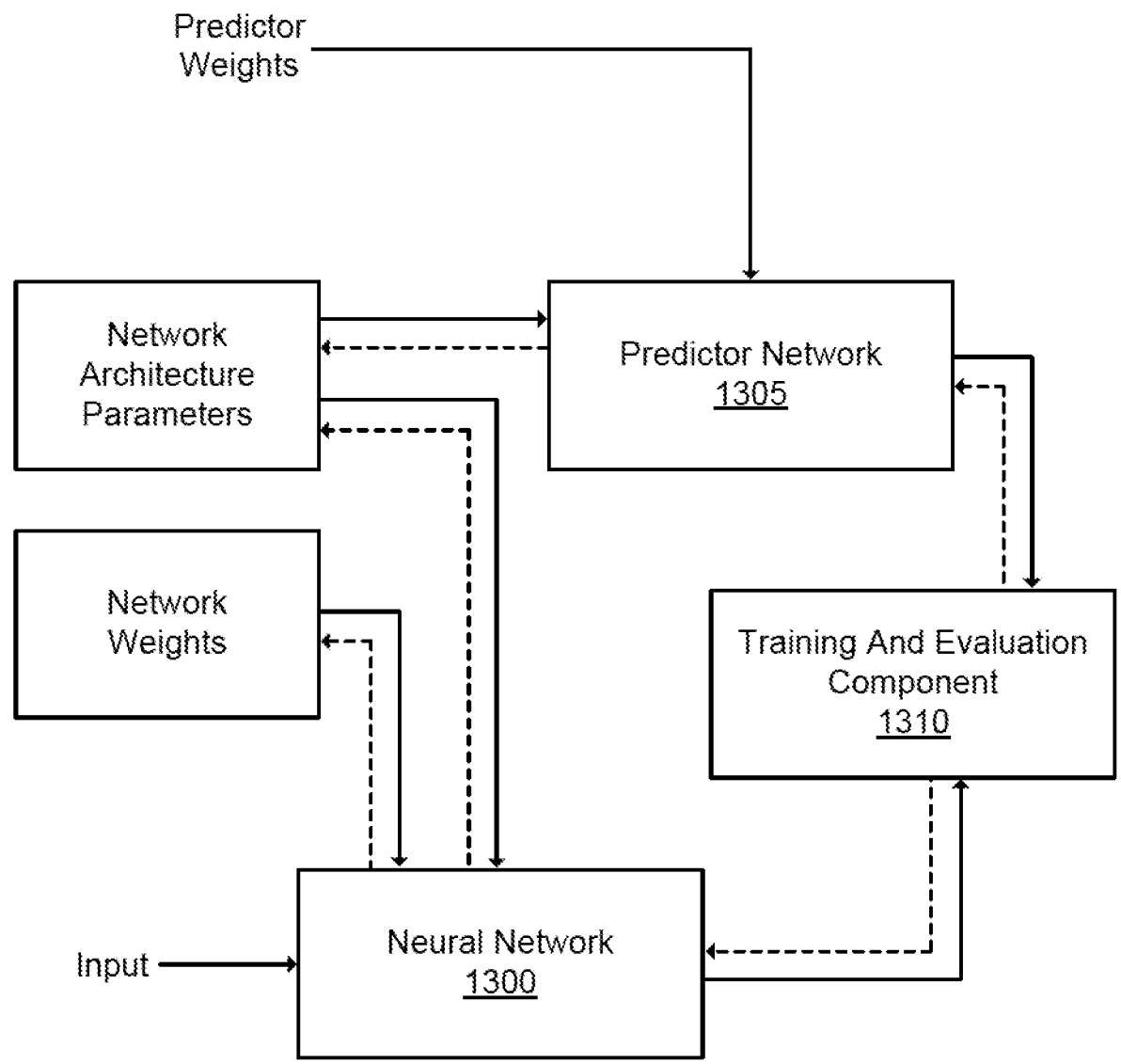

FIG. 13 shows an example of variable hardware predictor usage with differential NAS according to aspects of the present disclosure. The example shown includes neural network 1300, predictor network 1305, and training and evaluation component 1310. Neural network 1300 is an example of, or includes aspects of, the corresponding element described with reference to FIGS. 2, 4, 5, 8, 11, and 14. Predictor network 1305 is an example of, or includes aspects of, the corresponding element described with reference to FIGS. 10-12 and 14. Training and evaluation component 1310 is an example of, or includes aspects of, the corresponding element described with reference to FIGS. 10-12. In some aspects, FIG. 13 may illustrate a variable hardware predictor usage with differential NAS and implicit hardware parameters. A variable hardware predictor can be also used with a controller-based NAS.

Figure 14:
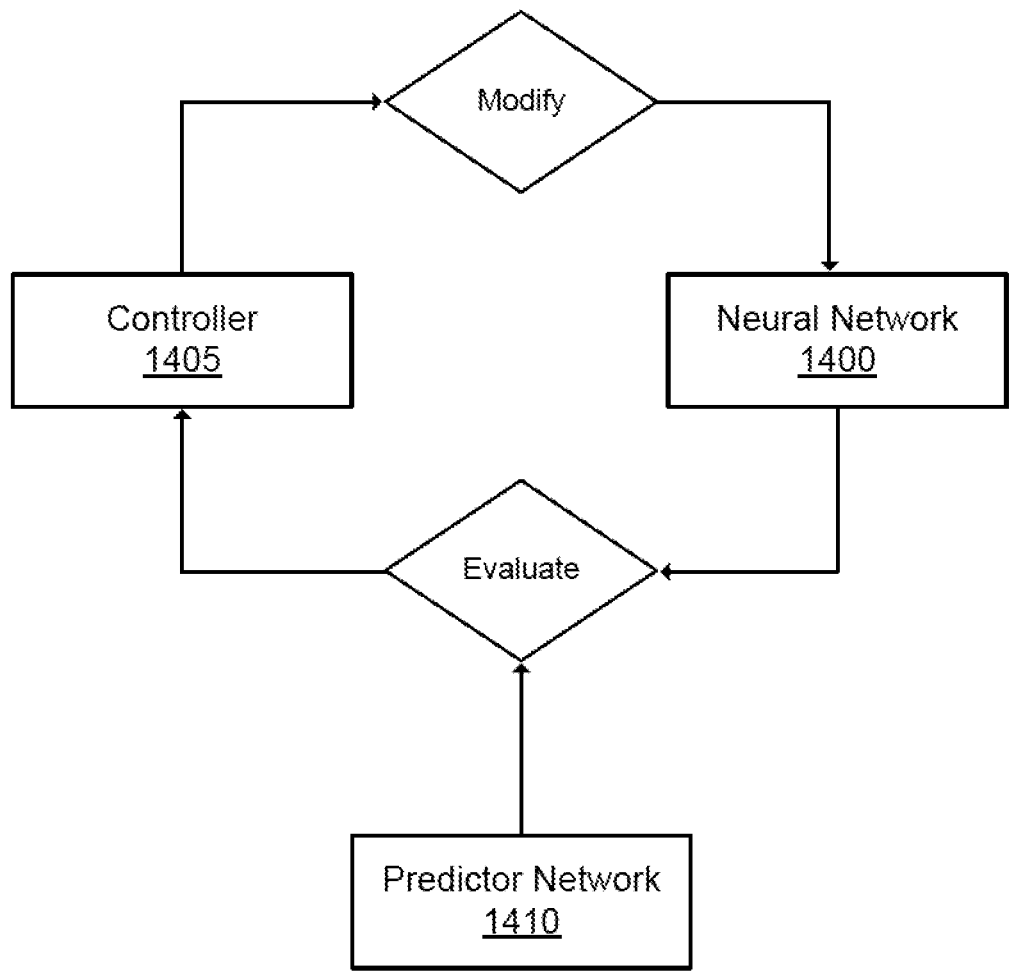
FIG. 14 shows an example of variable hardware predictor usage with controller based NAS according to aspects of the present disclosure.

FIG. 14 shows an example of variable hardware predictor usage with controller 1405-based NAS according to aspects of the present disclosure. The example shown includes neural network 1400, controller 1405, and 1410. Neural network 1400 is an example of, or includes aspects of, the corresponding element described with reference to FIGS. 2, 4, 5, 8, 11, and 13. Controller 1405 is an example of, or includes aspects of, the corresponding element described with reference to FIGS. 4 and 6. In some cases, controller 1405 may be referred to as a policy. Predictor network 1410 is an example of, or includes aspects of, the corresponding element described with reference to FIGS. 10-14. In some aspects, FIG. 14 shows a variable hardware predictor (e.g., predictor network 1410) can be used jointly with coarse-to-fine NAS and two-phase block NAS, providing a more reliable metric during the training process.

For instance, embodiments of the present disclosure use coarse-to-fine NAS, two-phase block NAS, a variable hardware predictor, and differential hardware design. First, a variable predictor is trained, as described herein. Then, a controller or policy (e.g., controller 1405) may be used to iteratively modify the neural network architecture (e.g., neural network 1400 architecture) along the dimensions formed by part of the architecture parameters. The modification is applied to blocks (e.g., subnetworks) within the neural network. In each iteration, the remainder of the architecture parameters are modified and learned with a differential NAS method. The training process is performed with two-phase block NAS and incorporates a variable hardware predictor to retrieve PPA. The hardware parameters are learned as well using the variable hardware predictor (e.g., predictor network 1410).

Accordingly, the present disclosure includes the following embodiments.

A method for NAS is described. Embodiments of the method are configured to selecting a value of a coarse dimension during a NAS using a controller based search algorithm, wherein the controller based search algorithm includes a policy function for selecting the value of the coarse dimension, identifying a fine dimension for the NAS based at least in part on the value of the coarse dimension, selecting a value for the fine dimension during the NAS using a differential search algorithm, wherein the differential search algorithm is based on a loss function, and generating a neural network architecture based on the value of the coarse dimension and the value of the fine dimension.

An apparatus for NAS is described. The apparatus includes a processor, memory in electronic communication with the processor, and instructions stored in the memory. The instructions are operable to cause the processor to select a value of a coarse dimension during a NAS using a controller based search algorithm, wherein the controller based search algorithm includes a policy function for selecting the value of the coarse dimension, identify a fine dimension for the NAS based at least in part on the value of the coarse dimension, select a value for the fine dimension during the NAS using a differential search algorithm, wherein the differential search algorithm is based on a loss function, and generate a neural network architecture based on the value of the coarse dimension and the value of the fine dimension.

A non-transitory computer readable medium storing code for NAS is described. In some examples, the code comprises instructions executable by a processor to: select a value of a coarse dimension during a NAS using a controller based search algorithm, wherein the controller based search algorithm includes a policy function for selecting the value of the coarse dimension, identify a fine dimension for the NAS based at least in part on the value of the coarse dimension, select a value for the fine dimension during the NAS using a differential search algorithm, wherein the differential search algorithm is based on a loss function, and generate a neural network architecture based on the value of the coarse dimension and the value of the fine dimension.

A system for NAS is described. Embodiments of the system are configured to selecting a value of a coarse dimension during a NAS using a controller based search algorithm, wherein the controller based search algorithm includes a policy function for selecting the value of the coarse dimension, identifying a fine dimension for the NAS based at least in part on the value of the coarse dimension, selecting a value for the fine dimension during the NAS using a differential search algorithm, wherein the differential search algorithm is based on a loss function, and generating a neural network architecture based on the value of the coarse dimension and the value of the fine dimension.

In some examples, the coarse dimension comprises a number of layers, a layer type, a layer connectivity, or any combination thereof. In some examples, the fine dimension comprises a layer size, a number of channels, a filter size, a cell size, a gate size, an activation function, or any combination thereof. In some examples, the controller based search algorithm comprises a reinforcement learning algorithm or an evolutionary search algorithm.

Some examples of the method, apparatus, non-transitory computer readable medium, and system described above further include configuring a block of a neural network based on the NAS. Some examples further include computing a first loss function based on an intermediate output of the block using a first loss function. Some examples further include updating the NAS for the block based on the first loss function. Some examples further include computing a second loss function using a final output of the neural network after updating NAS based on the first loss function. Some examples further include updating the NAS for the neural network based on the second loss function.

Some examples of the method, apparatus, non-transitory computer readable medium, and system described above further include identifying neural architecture parameters including the value of the coarse dimension and the value of the fine dimension. Some examples further include identifying a set of hardware parameters. Some examples further include predicting PPA parameters using a variable hardware predictor. Some examples further include iteratively updating the neural architecture parameters and the hardware parameters based on the predicted PPA parameters. Some examples further include generating a hardware design based on the updated hardware parameters.

Some examples of the method, apparatus, non-transitory computer readable medium, and system described above further include selecting the hardware parameters using a neural network trained using the differential training algorithm.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
    identifying a plurality of dimensions of a neural architecture search into a first group of dimensions including a coarse dimension and a second group of dimensions including a fine dimension;
    selecting a value of the coarse dimension during a coarse search phase of a neural architecture search using a controller based search algorithm, wherein the controller based search algorithm for the coarse search phase includes iteratively altering the value of the coarse dimension using a policy function;
    identifying a search space corresponding to the fine dimension from the second group of dimensions for a fine search phase of the neural architecture search based at least in part on the value of the coarse dimension selected during the coarse search phase of the neural architecture search;
    selecting a value for the fine dimension during the fine search phase of the neural architecture search using a differential search algorithm, wherein the differential search algorithm is based on a loss function; and
    generating a neural network architecture based on the value of the coarse dimension and the value of the fine dimension.

2. The method of claim 1, wherein:
    the coarse dimension comprises a number of layers, a layer type, a layer connectivity, or any combination thereof.

3. The method of claim 1, wherein:
    the fine dimension comprises a layer size, a number of channels, a filter size, a cell size, a gate size, an activation function, or any combination thereof.

4. The method of claim 1, wherein:
    the controller based search algorithm comprises a reinforcement learning algorithm or an evolutionary search algorithm.

5. The method of claim 1, further comprising:
    configuring a block of a neural network based on the neural architecture search;
    computing a first loss function based on an intermediate output of the block;
    updating the neural architecture search for the block based on the first loss function;
    computing a second loss function using a final output of the neural network after updating neural architecture search based on the first loss function; and
    updating the neural architecture search for the neural network based on the second loss function.

6. The method of claim 1, further comprising:
    identifying neural architecture parameters including the value of the coarse dimension and the value of the fine dimension;
    identifying a set of hardware parameters;
    predicting power, performance, and area (PPA) parameters using a variable hardware predictor;
    iteratively updating the neural architecture parameters and the hardware parameters based on the predicted PPA parameters; and
    generating a hardware design based on the updated hardware parameters.

7. The method of claim 6, further comprising:
    selecting the hardware parameters using a neural network trained using a differential training algorithm.

8. An apparatus comprising a processor and a memory storing instructions and in electronic communication with the processor, the processor being configured to execute the instructions to:
    identify a plurality of dimensions of a neural architecture search into a first group of dimensions including a coarse dimension and a second group of dimensions including a fine dimension;
    select a value of the coarse dimension during a coarse search phase of a neural architecture search using a controller based search algorithm, wherein the controller based search algorithm for the coarse search phase includes iteratively altering the value of the coarse dimension using a policy function;

identify a search space corresponding to the fine dimension from the second group of dimensions for a fine search phase of the neural architecture search based at least in part on the value of the coarse dimension selected during the coarse search phase of the neural architecture search;

select a value for the fine dimension during the fine search phase of the neural architecture search using a differential search algorithm, wherein the differential search algorithm is based on a loss function; and generate a neural network architecture based on the value of the coarse dimension and the value of the fine dimension.

9. The apparatus of claim 8, wherein:
the coarse dimension comprises a number of layers, a layer type, a layer connectivity, or any combination thereof.

10. The apparatus of claim 8, wherein:
the fine dimension comprises a layer size, a number of channels, a filter size, a cell size, a gate size, an activation function, or any combination thereof.

11. The apparatus of claim 8, wherein:
the controller based search algorithm comprises a reinforcement learning algorithm or an evolutionary search algorithm.

12. The apparatus of claim 8, the processor being further configured to execute the instructions to:
configure a block of a neural network based on the neural architecture search;
compute a first loss function based on an intermediate output of the block;
update the neural architecture search for the block based on the first loss function;
compute a second loss function using a final output of the neural network after updating neural architecture search based on the first loss function; and
update the neural architecture search for the neural network based on the second loss function.

13. The apparatus of claim 8, the processor being further configured to execute the instructions to:
identify neural architecture parameters including the value of the coarse dimension and the value of the fine dimension;
identify a set of hardware parameters;
predict power, performance, and area (PPA) parameters using a variable hardware predictor;
iteratively update the neural architecture parameters and the hardware parameters based on the predicted PPA parameters; and
generate a hardware design based on the updated hardware parameters.

14. The apparatus of claim 13, the processor being further configured to execute the instructions to:
select the hardware parameters using a neural network trained using a differential training algorithm.

15. A non-transitory computer readable medium storing code, the code comprising instructions executable by a processor to:
identifying a plurality of dimensions of a neural architecture search into a first group of dimensions including a coarse dimension and a second group of dimensions including a fine dimension;

select a value of the coarse dimension during a coarse search phase of a neural architecture search using a controller based search algorithm, wherein the controller based search algorithm for the coarse search phase includes iteratively altering the value of the coarse dimension using a policy function;

identify a search space corresponding to the fine dimension from the second group of dimensions for a fine search phase of the neural architecture search based at least in part on the value of the coarse dimension selected during the coarse search phase of the neural architecture search;

select a value for the fine dimension during the fine search phase of the neural architecture search using a differential search algorithm, wherein the differential search algorithm is based on a loss function; and generate a neural network architecture based on the value of the coarse dimension and the value of the fine dimension.

16. The non-transitory computer readable medium of claim 15, wherein:
the coarse dimension comprises a number of layers, a layer type, a layer connectivity, or any combination thereof.

17. The non-transitory computer readable medium of claim 15, wherein:
the fine dimension comprises a layer size, a number of channels, a filter size, a cell size, a gate size, an activation function, or any combination thereof.

18. The non-transitory computer readable medium of claim 15, wherein:
the controller based search algorithm comprises a reinforcement learning algorithm or an evolutionary search algorithm.

19. The non-transitory computer readable medium of claim 15, the code further comprising instructions executable by the processor to:
configure a block of a neural network based on the neural architecture search;
compute a first loss function based on an intermediate output of the block;
update the neural architecture search for the block based on the first loss function;
compute a second loss function using a final output of the neural network after updating neural architecture search based on the first loss function; and
update the neural architecture search for the neural network based on the second loss function.

20. The non-transitory computer readable medium of claim 15, the code further comprising instructions executable by the processor to:
identify neural architecture parameters including the value of the coarse dimension and the value of the fine dimension;
identify a set of hardware parameters;
predict power, performance, and area (PPA) parameters using a variable hardware predictor;
iteratively update the neural architecture parameters and the hardware parameters based on the predicted PPA parameters; and
generate a hardware design based on the updated hardware parameters.

* * * * *